United States Patent [19]

Hampson

[11] Patent Number: 4,847,902

[45] Date of Patent: Jul. 11, 1989

[54] DIGITAL COMPUTER SYSTEM FOR EXECUTING ENCRYPTED PROGRAMS

[75] Inventor: Bradford E. Hampson, Framingham, Mass.

[73] Assignee: Prime Computer, Inc., Natick, Mass.

[21] Appl. No.: 579,089

[22] Filed: Feb. 10, 1984

[51] Int. Cl.[4] .............................................. H04L 9/00
[52] U.S. Cl. ......................................... 380/4; 380/25; 380/49
[58] Field of Search .......................... 178/22.08, 22.09; 364/200, 900; 380/3, 4, 28, 49, 23, 25

[56] References Cited

U.S. PATENT DOCUMENTS

| | | | |
|---|---|---|---|
| 4,246,638 | 1/1981 | Thomas | 178/22.08 |
| 4,278,837 | 7/1981 | Best | 178/22.09 |
| 4,306,111 | 12/1981 | Lu et al. | 380/30 |
| 4,306,289 | 12/1981 | Lumley | 178/22.08 |
| 4,433,207 | 2/1984 | Best | 178/22.08 |
| 4,513,174 | 4/1985 | Herman | 178/22.08 |
| 4,525,599 | 6/1985 | Curran et al. | 178/22.08 |
| 4,525,777 | 6/1985 | Webster et al. | 364/200 |
| 4,573,119 | 2/1986 | Westheimer et al. | 178/22.09 |
| 4,590,470 | 5/1986 | Koenig | 340/825.31 |

OTHER PUBLICATIONS

"Computer Dictionary and Handbook", by Sippl & Sippl copyright 1980, 3rd Edition.

Primary Examiner—Stephen C. Buczinski
Assistant Examiner—Bernarr Earl Gregory
Attorney, Agent, or Firm—Lahive & Cockfield

[57] ABSTRACT

A digital computer system adapted for executing a set of instructions including at least one encrypted instruction. The system includes a main memory for storing the instructions, a cache memory for storing selected instructions with a relatively fast access time, a selectively operable decryption system for decrypting selected encrypted instructions from the main memory, and a central processing unit. The system is adapted so that the program stored in the main memory may be executed by the central processing unit. To this end, the decrypted instructions are decrypted only during execution when those instructions are transferred from the main memory to the cache memory so that plaintext versions of those encrypted instructions exist only in the cache memory in response to requests by the central processing unit while executing the program.

7 Claims, 1 Drawing Sheet

DIGITAL COMPUTER SYSTEM FOR EXECUTING ENCRYPTED PROGRAMS

BACKGROUND OF THE INVENTION

The present invention is related to computer systems, and more particularly, to computer systems specially adapted for executing encrypted program instructions There are many known techniques for protecting information, whether programs or other kinds of information using encryption. The present invention applies prior art encryption techniques to computer systems in order to provide protection against the unauthorized use of computer programs o software.

It is known that a software supplier can control the use of his software to a certain extent simply by encrypting it and arranging for the operating system, or applications subsystem, of a computer to decrypt the "protected" software prior to execution. However, with this approach, the plaintext version of the program is vulnerable to being copied by relatively trivial circumventions of the operating or application systems In the prior art, U.S. Pat. No. 4,278,837, discloses a technique of encryption of the program-to-be-protected, of the encrypted program to obtain an executable set of instructions. However, the method of that patent requires a specialized microprocessor chip as the execution engine. Furthermore, the method of that patent exacts a considerable execution performance penalty.

It is an object of the present invention to provide an improved computer system for executing encrypted computer programs.

It is another object to provide a computer system which minimizes the accessibility of plaintext versions of an encrypted program to a user.

SUMMARY OF THE INVENTION

Briefly, the present invention is a digital computer system for executing at least one program which includes a set of instructions, where at least one set includes at least one encrypted instruction. The system includes a main memory for storing the programs, a cache memory, a decryption subsystem, and a central processing unit. In various forms of the invention, the system may be a virtual memory computing system or a multi-processor computing system. The system does not require a specially designed microprocessor.

The cache memory is adapted to store selected instructions from the main memory. The instructions in the cache memory are made available (with fast access time) to the central processing unit. The selected instructions are selected non-decrypted instructions corresponding to non-encrypted instructions or encrypted instructions in the set of instructions in the main memory, or encrypted instructions corresponding to encrypted instructions in that set in main memory, or decrypted instructions corresponding to encrypted instructions in that set in the main memory.

The decryption subsystem is selectively operable, when enabled by the central processing unit, for receiving an encrypted instruction from the main memory. The decryption subsystem decrypts any such received instruction to generate a corresponding decrypted instruction, and then transfers that decrypted instruction to the cache memory for storage in that memory.

The central processing unit is selectively operable in an execute mode for performing a cache search to detect the presence of an instruction in the cache memory. When such an instruction is not resident in the cache memory, the central processing unit effects the transfer of that instruction from the main memory to the decryption sub-system and then enables the decryption subsystem. The resulting decrypted instruction is then both stored in the cache memory and supplied to the central processing unit for execution. When the instruction is resident in the cache memory, if the instruction is non-encrypted then that instruction is transferred from the cache memory to the CPU. If the instruction is encrypted and the cache memory contains the corresponding decrypted instruction, it is similarly transferred; but if the cache memory contains, instead, the corresponding encrypted instructions, then that cache entry is invalidated and the cache memory is deemed not to contain the requested instruction. The CPU then acquires the decrypted instruction via the cache memory and decryption unit as described above.

The central processing unit is also selectively operable in a fetch mode for performing a cache search for an instruction in the cache memory. This situation arise for example, when one program tries to copy the instructions of another program. When any such instruction is resident in the cache memory and the instruction is a decrypted instruction, the corresponding encrypted instruction is transferred from the main memory to the central processing unit. That is, the encrypted rather than decrypted, or plaintext, form of that instruction is transferred to the central processor during the fetch mode. When the requested instruction is resident in the cache memory and the instruction is a non-decrypted instruction, however, the instruction is transferred directly from the cache memory to the central processing unit. When the instruction is not resident in the cache memory, the instruction is transferred from the main memory to the cache memory in the form that instruction resides in the memory, that is, either encrypted or non-encrypted.

With this configuration, the plaintext, or non-encrypted version of any encrypted instruction is only available in the cache memory in response to operation by the central processing unit in the execute mode for the program. Any other request for transfer of such an encrypted instruction results in the transfer of the instruction in encrypted form to the central processing unit. Thus, the plaintext of the program is never visible to any executing agent, or any user other than the protected program itself. No operating or application system override yields access to the plaintext of the program.

In various forms of the invention, the cache memory may be specially adapted to store a tag in association with each instruction stored in that memory. The tag is characterized by a first value for an instruction which was transferred to the cache memory for storage by way of the decryption subsystem, and by a second value for an instruction which was transferred for storage in cache memory directly from the main memory. With this configuration, the central processing unit may determine whether or not an instruction identified during a cache search is a decrypted or non-decrypted instruction based on the tag stored in the cache memory in association with that instruction.

Furthermore, the system may be adapted to execute one or more encrypted programs, where each encrypted program, or subroutine of such programs, may be encrypted with an associated encryption algorithm or key. In this configuration, the decryption subsystem includes an associated decryption key (or defines an associated decryption algorithm) which is necessary for use by the decryption subsystem in decrypting the instructions of each respective program. The central processing unit is operable during the execution of the programs for controlling the decryption subsystem to utilize the stored decryption key (or algorithm) associated with the program (or subroutine) to generate the decrypted instruction when the decrypting subsystem is enabled during execution. In this manner, the system of the invention may be used to execute separately (and differently) encrypted programs or subroutines within programs, under the control of the central processing unit. In one form of the invention, the decryption subsystem may include a write-only memory for storing the one or more decryption keys.

In various forms of the invention, the encryption and decryption algorithms for use in encrypting and decrypting the respective program instructions may be performed using an encryption key uniquely associated with the computer system, where the decryption key is substantially not derivable from the encryption key. By way of example, any known public key system may be utilized in performing the encryption and decryption operations.

With the present invention, in one form, each copy of a "protected" program will execute only the single computer for which that program is produced. A prospective user of an encrypted (or protected) program is required to obtain from the producer of the protected program, a separate copy of the program for each computer on which the program is to be executed. However, the user may freely make additional copies of the protected program for back-up, that is, for a hedge against loss by storage media, corruption or other computer system failure, or archival purposes. Any such copy performs in all respects like the original version, that is, the copy will only execute on the single computer designated by the software program producer. As a result, the user is unable to sell or give a copy of the program that will execute on the computer belonging to a third party unless that computer is the same computer designated by the program producer to execute the copy of the original program. As a result, a program producer may generate "protected" programs and distribute them or use only on a designated computer or computers. Of course, any "authorized" user of the program on the designated computer may provide use of the program to his authorized users, for example, in time sharing services in which third parties connect to the designated computer over telephone lines. Also, the program may be used in conjunction with distributed network services, provided the actual execution of the "protected" program is performed on the designated computer which may be coupled to the communications network. As a result, the third party connected to the network may request that the program be executed, and as long as that execution is being performed on the designated computer, that request may be honored. Of course, the results of any performance of the program may be available to the requesting computer by way of the network. However, in all cases, a third party cannot, by any means, except by application to the program producer, obtain unlimited use of a distinct and separate copy of the protected program.

BRIEF DESCRIPTION OF THE DRAWING

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
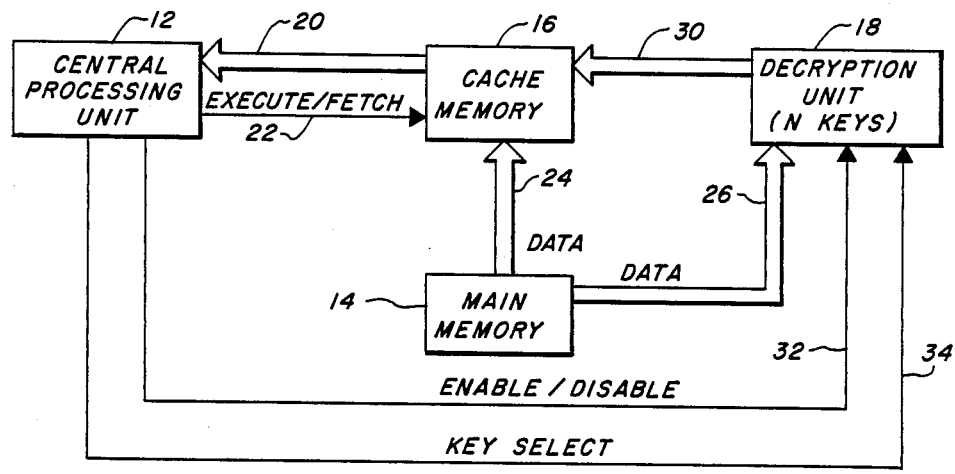
FIG. 1 shows, in block diagram form, an exemplary embodiment of the present invention.

FIG. 1 shows a digital computer system 10 embodying the present invention. The system 10 includes central processing unit 12, main memory 14, cache memory 16 and decryption unit 18. By way of example, the central processing unit 12, main memory 14 and cache memory 16 may be conventional type elements of a computer system, such as those included in the model 9950 manufactured by Prime Computer, Inc., Natick, Mass. The cache memory 16 is a high speed random access memory which provides an effective increase in access speed to the main memory 14 by holding copies of the portions of the main memory 14 currently in use by the CPU 12. The decryption unit 18 may be a conventional type means for decrypting encrypted instructions, as modified to operate as described below. The operating system of the central processor 12 is adapted to control functioning in the manner described below. In the illustrated configuration, an encrypted program-to-be-executed resides in main memory 14. In alternate embodiments, the system 10 may include a virtual memory type system, where the so-called main memory may include a first portion including address data representative of the location in a second portion of that memory where the instructions of the program P are stored. In the presently described embodiment, however, the entire program P is resident in the main memory 14.

An execute/fetch signal path 22 and a plaintext instruction data path 20 couple the central processing unit 12 to the cache memory 16. The main memory 14 is coupled to the cache memory by way of data signal path 24 and to the decryption unit 18 by way of data signal path 26. The decryption unit 18 is coupled to the cache memory by way of plaintext signal path 30. The central processing unit is also connected to the decryption unit 18 by way of enable/disable signal path 32 and key select signal path 34. In the present embodiment, the decryption unit 18 includes a write-only memory for storing a plurality of decryption keys.

In operation, the central processing unit 12 may be commanded in a conventional manner to commence an execution of the program P at its starting address in main memory 14. The central processing unit (CPU) 12 obtains the binary representation of instructions to be executed from the cache memory 16 by wa of the data path 20. In carrying out this function, a search of the cache memory 16 is performed to determine whether or not the requested instruction is present in cache memory 16.

In accordance with the present invention, the cache memory 16 contains the only copy of decrypted or plaintext instructions of the program P. In practice, cache memory 16 generally does not contain the entire decrypted program P simultaneously, because the cache memory 16 is usually much smaller than the size of the program P stored in main memory 14. The cache memory 16 does however contain the contents of the addresses of the instructions of program P required by CPU 12 substantially when that information is needed. When requested by the CPU 12, the cache memory 16 is searched for the required address. Typically, the cache hit rate, that is, the percentage of times a requested address is present in the cache memory 16 when requested, is on the order of 80 to 95% on a continuous basis.

During the execution of the program P, the CPU 12 selects a decryption key for use by decryption unit 18 (by way of path 34) to accommodate the decryption of program P. As a result, the decryption unit 18 determines which decryption key is used with the respective instructions of program P which may be transferred from the main memory 14 to the CPU 12. By way of example, the key select value for the respective programs, or subroutines, may be stored with an image of the program on secondary storage, such as disk, and may thus be obtained and held by the operating system when said program is read into main memory 14. Where the system 10 architecture includes a hardware or firmware procedure call instruction or implementation, then the built-in procedure call mechanism accommodates changing key select values when a call is made from one separately protected program or subroutine to another. Thus, the key select value required by a procedure may be considered as an attribute of that procedure.

In addition, in operation, the CPU 12 ensures that the signal on path 32 is correctly provided to the decryption unit 18. These ENABLE/DISABLE values of that signal are appropriately set with the program being executed in a combination with each cache search. More particularly, the enable/disable signal path 32 is set to the value ENABLE whenever an instruction or constant is to be fetched that is a part of the memory image of the program P currently executing. In this context, the term memory image excludes working storage for the program allocated at run time, such as stack or heap storage. The enable/disable signal is set to the value DISABLE whenever an operand is fetched that is not a part of the memory image of the executing program P.

When the central processor 12 requests the contents of a memory address A in program P, a search of cache 16 is conducted. If cache 16 has a valid copy of the contents C of address A, then one of the following occurs:

1. If the execute/fetch signal on path 22 has the value EXECUTE, meaning that the purpose of the cache search is to find an instruction or constant that is part of the memory image of the program P, then if the contents C found in the cache represent the decrypted contents of address A, they are transmitted to CPU 12 over path 20, completing the cache search. If the contents C found in the cache represent the encrypted contents of address A, the cache entry is invalidated and the decrypted contents are found as described below.

2. If the execute/fetch signal on path 22 has the value FETCH, meaning that the purpose of the cache search is to find an operand not part of the memory image of the program P, then the action depends on how contents C were loaded into cache 16. Of particular importance is the need to prevent an unauthorized program P' from using regular data-movement instructions to copy the image of the encrypted program P from main memory 14, through decryption unit 18 and cache 16 into its (that of program P') own working storage, thus obtaining a plaintext copy of P. The cases are:

a. The contents C were loaded into cache 16 when signal enable/disable on line 32 had the value ENABLE and Key Select signal on line 34 was not null, meaning that C is a decrypted version of the contents of address A of encrypted program P (or some other encrypted program). Since the request for C is not being made by program P itself (otherwise, the execute/fetch signal line 22 would have had the value EXECUTE), the decrypted data can not be provided. The contents C are instead fetched from main memory 14 via path 24, and then via path 20 to CPU 12.

b. The contents C were loaded into cache 16 when the enable/disable signal had the value DISABLE or Key Select signal on path 34 had the value null. In this case, C did not come from an encrypted program, and have not been transformed by decryption unit 18, and so the contents C can be transmitted to CPU 12 via path 20.

Which of these two cases obtains is represented by the value of a single "Decrypted Data" bit, stored in cache 16 with the contents C at the time of a cache miss, as described below.

If cache 16 does not have a copy of the contents of A, then a cache miss condition occurs. In this case, the contents C of address A in main memory are fetched. When the contents C are available, one of the following occurs:

1. If the Enable/Disable signal on path 32 has the value DISABLE or if the Key Select signal on path 34 has the value null, then the contents C are transmitted unmodified to cache 16 over path 24.

2. If the Enable/Disable signal on path 32 has the value ENABLE, and the Key Select signal on path 34 has a value other than null, the contents C are transmitted to decryption unit 18 over path 26. The contents C are transformed by decryption unit 18 according to the decryption key selected by the value of the Key Select signal, yielding a new contents C'. Those contents C' are transmitted to cache 16 over path 30.

At the time the contents C or C' are transferred to cache 16, the single bit, or tag, called the Decrypted Data bit, is generated and stored with those contents in cache 16. The value of the tag is indicative of whether the contents came from the decryption unit 18 via path 30, or unmodified from main memory 14 via path 24. This Decrypted Data tag is utilized by CPU 12 at cache search, as described above.

With the illustrated configuration, if no encrypted programs are executed, the performance at memory fetch is nearly (within a gate delay or two) identical to that present using conventional cache memory design. This is due to the existence of path 24 which allows the decryption unit 18, with its attendant propagation delay, to be bypassed when no decryption is required. The additional propagation delay that is imposed is due to the need to check the Execute/Fetch signal 22 against the Decrypted Data tag bit stored with each contents entry in cache 16.

When decryption is required, there are two cases:

1 The memory contents needed by CPU 12 are available in cache 16. In this event, no additional overhead compared to a conventional design is incurred. This will be the case, on average, for the fraction of fetches indicated by the system cache hit rate, which is typically 80 to 95 percent.

2. The memory contents are not in the cache 16, and so must be read from Main Memory 14 and decrypted by decryption unit 18. This generally imposes an additional delay on recovery from cache miss compared to a conventional cache design. When the cache hit rate is high, the impact of this delay on overall memory fetch performance is minimal.

Figure 2:
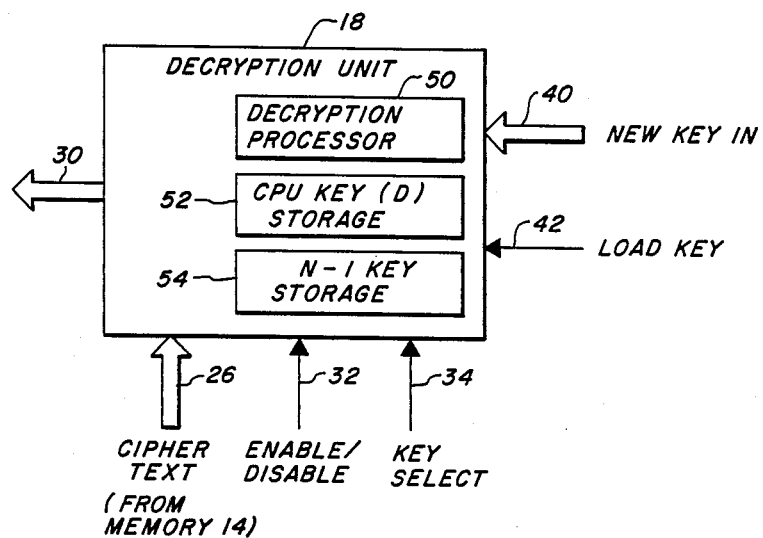
FIG. 2 shows, in block diagram form, the encryption unit of the system of FIG. 1.

FIG. 2 shows the decryption unit 18 of system 10 including a decryption processor 50, a CPU key storage device 52 and an N−1 key storage device 54, and shows two additional signal lines: New Key In line 40 and Load Key line 42. The decryption unit 18 includes permanent, non-overwritable decryption key for system 10 which is "built-in" to storage device 52 unit 18 at the time of manufacture and which is inaccessible to the outside world. In this configuration the signal lines 40 and 42 are used to load as many a N−1 (where N is an integer greater than 1) new keys into the N−1 key storage device 54 of decryption unit 18. The decryption key D has an associated encryption key E which may be publically available. In that case, the encryption and decryption keys are preferably designed to utilize a public key encryption/decryption technique, where the decryption key is substantially not derivable from the encryption key. The "protected" program P to be executed on system 10 is supplied with the decryption key Dp for that program P. The decryption key Dp is itself encrypted with the encryption key E for the system 10. Since the corresponding decryption key D is stored only in the decryption unit 18 of system 10, the key Dp is secure.

The user uses a suitable interface to convert the key Dp (supplied by the program producer) to machine readable form for unit 18, if it is not in that form already, and to manipulate the remaining signals of the decryption unit 18 as follows:

1. CPU 12 applies the appropriate Key Select value on path 34 for unit 18. This value is checked carefully, since if the wrong value is used an existing key may be overwritten and hence destroyed, forcing the user to reapply to the producer that provided the destroyed key for its replacement.

2. The new key Dp, in encrypted form, is placed on the New Key In line 40.

3. The Load Key line 42 is pulsed appropriately to load the new key 42 into unit 18.

In some embodiments, where not enough signal lines are provided for the New Key In line 40 to accommodate the number of bits in the encrypted key then the key Dp may be loaded in pieces of the bit width of the New Key In line 40.

Under the control of the decryption processor 50, the decryption unit 18 accepts the encrypted form of the new key Dp, then decrypts that key using its permanently installed CPU decryption key D. The decrypted version of the new key is then installed in the permanent write-only memory portion (device 54) of the decryption unit 18 such that it can be later invoked internally using the specified Key Select value applied by way of line 34. When enabled, the decryption processor 50 controls the decryption of instructions received from main memory 14, and transfers the resultant, plaintext instruction to cache memory 16.

In the preferred form, the decryption unit 18 is a single integrated circuit chip, or a hybrid integrated circuit, and performs the decryption of the new key Dp internally, such that the decrypted text of the key never appears outside the decryption unit where it might be subject to interception by electronic monitoring.

In order to provide protection against tampering, the CPU 12, cache memory 16 and decryption unit 18 all may be provided on a single integrated circuit chip, or inside a hermetically sealed hybrid integrated circuit. In this way, there would be no externally monitorable signals representing the plaintext program. Then the plaintext of the encrypted program could not be intercepted by electronic monitoring instruments while it is in transit on links 20 or 30, or on any of the links or in circuit elements internal to CPU 12, cache memory unit 16 or decryption unit 18.

Other forms of the invention could, at less development cost, merely make it difficult or prohibitively expensive for most customers to instrument their computer to obtain the plaintext. For example, the subassembly consisting of the CPU 12, cache 16 and description unit 18 may be sealed in a suitable resin or similar material, so that electrical contact with the data and signal paths and circuit elements is not possible. Here, even if no extraordinary steps were taken to prevent monitoring, the vast majority of persons would not have the technical expertise or the proper equipment to obtain the plaintext of the program by the monitoring technique.

In summary, the present invention is utilized in the following manner. A vendor supplies a "protected" program to a user only in executable form, which is a sequence of binary numbers for interpretation directly by the central processing unit of the user's computer to carry out the functions of the program, and not in so-called source form, which is the representation of the program in some computer programming language. Further, the executable form is encrypted such that the actual or plaintext sequence of binary numbers that represent the program cannot be feasibly computed from the encrypted sequence unless one possesses a specific decryption key. The encrypted program is not executable unless and until it has been decrypted with that specific decryption key.

The decryption key is selected by, and known only to, the program's producer, or manufacturer. The key is chosen so that it is substantially unique to the particular computer on which a given copy of the software decryptable with that key to execute. That is, duplicate keys are either not issued at all, or are rarely and randomly issued. A given key may apply to all, some or one of the programs sold for execution on the given computer. The user's computer is designed as described above and so is capable of executing such encrypted programs by decrypting them as they are executed, with minimal performance loss, and no possibility of the user intercepting and copying the plaintext of the program.

The producer is able to insert the decryption key(s) for the program(s) sold for execution on a given computer into that computer in such a way that they can not be read by anyone, including the producer or the user. Only the computer's central processing unit can use the key to decrypt the program while it is in execution. Many keys may be inserted into the computer by many different producers, so that the computer may execute encrypted programs, supplied by one or more producers, that are differently encrypted. The user or operating system may select which of the stored keys will be used to decrypt any given program. Further, the invention permits the execution of a composite program, wherein several differently-encrypted programs are each used as a conventional subroutine. It does this by allowing dynamic reselection of the decryption key as control flows from one encrypted subroutine to another. The invention also allows the computer to execute regular, non-encrypted programs by permitting the user, or operating system, to select the null decryption key for any program or subroutine.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A digital computer system for executing at least one program comprising a set of instructions, at least one of said sets including at least one encrypted instruction, said system comprising:
   A. main memory means for storing the instructions of said set,
   B. cache memory including means for storing selected instructions in said set, said selected instructions being
      1. selected non-decrypted instructions, that is, instructions, either in plaintext form or in encrypted form, which have not been decrypted; or
      2. selected decrypted instructions corresponding to said encrypted instructions in said set,
   C. decryption means selectively operable when enabled for receiving an encrypted instruction from said memory means, for decrypting said received instruction to generate a corresponding decrypted instruction, and for transferring said decrypted instruction to said cache memory for storage therein,
   D. central processing means including
      i. means selectively operable in an execute mode for searching for an instruction in said cache memory, and
         when said instruction is not resident in said cache memory, for transferring said instructions from said memory means to said decryption means and for enabling said decryption means, and
         when said decrypted instruction is resident in said cache memory for transferring said instruction from said cache memory to said central processing means and for executing said instruction, and
         when said corresponding encrypted instruction is resident in said cache memory, for removing said instruction from said cache memory, and for then transferring said instruction from said main memory means to said decryption means and for enabling said decryption means
      ii. means selectively operable in a fetch mode for searching for an instruction in said cache memory, and
         when said instruction is resident in said cache memory and said instruction is a decrypted instruction, for transferring said corresponding encrypted instruction from said main memory means to said cache memory and to said central processing means,
         when said instruction is resident in said cache memory and said instruction is a non-decrypted instruction, for transferring said instruction from said cache memory to said central processing means, and
         when said instruction is not resident in said cache memory, for transferring said instruction from said main memory means to said cache memory and to said central processing means.

2. A system according to claim 1 wherein
   said cache memory includes means for storing a tag associated with each instruction stored therein, said tag being characterized by a first value for a stored instruction when said stored instruction was transferred thereto from said decryption means and by a second value for a stored instruction when said stored instruction was transferred thereto from said main memory means, and wherein
   said central processing means includes means for determining whether an instruction identified during a cache search is a decrypted instruction or a non-decrypted instruction from the tag stored in said cache memory is association with said instruction, said non-decrypted instruction being an instruction, either in plaintext form or in encrypted form, which has not been decrypted.

3. A system according to claim 1 wherein said decryption means includes means for storing one or more decryption keys, each of said decryption keys being associated with at least one of said programs and providing information necessary for use by said decryption means in decrypting an encrypted instruction in said programs, and
   wherein said central processing means includes means operable during the execution of one of said programs for controlling said decryption means to use the stored decryption key associated with said one program to generate said decrypted instructions when said decryption means is enabled during said execution.

4. A system according to claim 3 wherein said decryption key storage means includes a write-only memory portion for storing a decrypted version of at least one said decryption key which decrypted version can be invoked only internally to said decryption means.

5. A system according to claim 1 or 2 or 3 or 4 wherein said encrypted instructions are encrypted using an encryption key uniquely associated with said system, said decryption keys being substantially not derivable from said encryption key.

6. A system according to claims 1 or 2 or 3 or 4 wherein said main memory means is a virtual memory system including a first section for storing instructions of said programs in addressed locations, and a second section for storing data representative of the address of the locations of the respective stored instructions.

7. A system according to claim 6 wherein said encrypted instructions are encrypted using an encryption key uniquely associated with said system, said decryption keys being substantially not derivable from said encryption key.

* * * * *